(12) United States Patent
Kumagai et al.

(10) Patent No.: US 11,703,226 B2
(45) Date of Patent: Jul. 18, 2023

(54) GAS TURBINE COMBUSTOR

(71) Applicant: Mitsubishi Heavy Industries, Ltd., Tokyo (JP)

(72) Inventors: Satoshi Kumagai, Tokyo (JP); Yoshihide Wadayama, Tokyo (JP); Keisuke Miura, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 17/146,772

(22) Filed: Jan. 12, 2021

(65) Prior Publication Data
US 2021/0285639 A1   Sep. 16, 2021

(30) Foreign Application Priority Data

Mar. 16, 2020 (JP) ................ 2020-045140

(51) Int. Cl.
*F23R 3/28* (2006.01)
*F02C 7/22* (2006.01)
*F23R 3/34* (2006.01)

(52) U.S. Cl.
CPC ............ *F23R 3/286* (2013.01); *F02C 7/22* (2013.01); *F05D 2260/941* (2013.01); *F05D 2260/96* (2013.01); *F05D 2260/964* (2013.01); *F23R 3/28* (2013.01); *F23R 3/343* (2013.01); *F23R 2900/00005* (2013.01); *F23R 2900/00014* (2013.01)

(58) Field of Classification Search
CPC ...................................................... F23R 3/286
See application file for complete search history.

(56) References Cited

U.S. PATENT DOCUMENTS

| 2009/0031728 | A1 | 2/2009 | Miura et al. |
| 2012/0180487 | A1* | 7/2012 | Uhm ............... F23D 14/62 60/737 |

(Continued)

FOREIGN PATENT DOCUMENTS

| CN | 102606314 A | 7/2012 |
| CN | 105318355 A | 2/2016 |

(Continued)

OTHER PUBLICATIONS

German-language Office Action issued in German Application No. 10 2021 200 776.7 dated Mar. 18, 2022 with English translation (eight (8) pages).

(Continued)

*Primary Examiner* — Katheryn A Malatek
*Assistant Examiner* — Alyson Joan Harrington
(74) *Attorney, Agent, or Firm* — Crowell & Moring LLP (57) ABSTRACT

A gas turbine combustor includes a burner composed of a fuel nozzle group having a plurality of fuel nozzles for fuel supply, a fuel nozzle plate structurally supporting the fuel nozzles and serving to distribute the fuel flowing from an upstream side to the fuel nozzles, and a perforated plate located downstream of the fuel nozzles and having nozzle holes corresponding to the fuel nozzles. The fuel nozzle group includes outer circumferential fuel nozzles and inner circumferential fuel nozzles. Each outer diameter of at least a proximal end of the outer circumferential fuel nozzles is larger than that of the inner circumferential fuel nozzles.

5 Claims, 5 Drawing Sheets

(56) References Cited

U.S. PATENT DOCUMENTS

| | | | |
|---|---|---|---|
| 2016/0010864 A1* | 1/2016 | Abe | F23R 3/32 60/748 |
| 2016/0033136 A1* | 2/2016 | Kumagai | F23R 3/283 60/737 |
| 2016/0377294 A1 | 12/2016 | Wadayama et al. | |
| 2018/0003386 A1* | 1/2018 | Wadayama | F02C 3/30 |
| 2018/0149364 A1* | 5/2018 | Berry | F23R 3/286 |
| 2019/0011131 A1 | 1/2019 | Roh et al. | |

FOREIGN PATENT DOCUMENTS

| | | |
|---|---|---|
| CN | 106287815 A | 1/2017 |
| CN | 107559880 A | 1/2018 |
| CN | 109724109 A | 5/2019 |
| DE | 10 2011 055 472 A1 | 7/2012 |
| JP | 2011-58775 A | 3/2011 |
| JP | 2012-149868 A | 8/2012 |
| JP | 2018-3696 A | 1/2018 |

OTHER PUBLICATIONS

Chinese-language Office Action issued in Chinese Application No. 202110128072.4 dated Apr. 29, 2022 with English translation (24 pages).

Chinese-language Office Action issued in Chinese Application No. 202110128072.4 dated Oct. 12, 2022 with English translation (24 pages).

Japanese-language Office Action issued in Japanese Application No. 2020-045140 dated Dec. 6, 2022 with English translation (eight (8) pages).

* cited by examiner

PRIOR ART

GAS TURBINE COMBUSTOR

CLAIM OF PRIORITY

The present application claims priority from Japanese Patent application serial no. 2020-45140, filed on Mar. 16, 2020, the content of which is hereby incorporated by reference into this application.

BACKGROUND OF THE INVENTION

The present invention relates to a gas turbine combustor, and particularly, to the gas turbine combustor including many fuel nozzles, and a fuel nozzle plate for structurally supporting the fuel nozzles.

Strict environmental standards for NOx emission from gas turbines in operation have been set for the purpose of reducing the environmental load owing to the exhaust gas.

The NOx emission will increase as the flame temperature becomes higher. It is therefore necessary to ensure uniform combustion by suppressing formation of the flame at locally high temperature. For the uniform combustion, it is necessary to provide many fuel nozzles for fuel injection so that the fuel dispersiveness is improved.

Japanese Patent Laid-Open No. 2011-58775 discloses the generally employed process of reducing NOx emission.

Japanese Patent Laid-Open No. 2011-58775 discloses the process of reducing NOx emission by decreasing the pressure loss of the coaxial nozzle, and promoting the fuel-air mixture, as described below. The member for causing turbulence in the air flow is provided either in the tip end of the fuel nozzle constituting the coaxial nozzle or the inside of the passage of the nozzle hole formed in the perforated plate at which the tip end of the fuel nozzle is positioned, thereby the minimum passage section area of the nozzle hole of the coaxial nozzle is defined. The minimum passage section area of the nozzle hole of the coaxial nozzle for the burner at the outer circumferential side among those arranged in a plurality of rows becomes larger than the minimum passage section area of the nozzle hole of the coaxial nozzle for the burner at the center side.

SUMMARY OF THE INVENTION

In the gas turbine combustor including many fuel nozzles and the fuel nozzle plate for structurally supporting the fuel nozzles, increase in the number of the fuel nozzles for improving the fuel dispersiveness may shorten a distance between the fuel nozzles.

As a result, the space around the fuel nozzle narrows. In order to secure the space for bonding the fuel nozzle to the fuel nozzle plate, or the space between the fuel nozzles, serving as the air passage, it is necessary to reduce an outer diameter of the fuel nozzle in association with the increase in the number of the fuel nozzles.

Meanwhile, vibration may occur in the fuel nozzles disposed in the flow field of the compressed air under the fluid force. The fluid force acting on the fuel nozzle differs by the position of the fuel nozzle. If each outer diameter of the fuel nozzles is the same, the vibration stress which occurs under the fluid force also differs by the position of the fuel nozzle. Accordingly, increase in the outer diameter of the fuel nozzle may be one of the most effective approaches for reducing the vibration stress.

In order to establish both improvement in the fuel dispersiveness and reduction in the vibration stress, however, the present inventors have found that it is preferable to optimize each outer diameter of the respective fuel nozzles in consideration of the fluid force that differs by the position of the fuel nozzle.

The present invention provides a gas turbine combustor with structural reliability to the vibration under the fluid force and high environmental performance owing to the uniform combustion, which are achieved by optimizing the outer diameter of the fuel nozzle under the fluid force that differs by the position of the fuel nozzle.

The gas turbine combustor according to the present invention includes a burner provided with a fuel nozzle group having a plurality of fuel nozzles for fuel supply, a fuel nozzle plate structurally supporting the fuel nozzles and serving to distribute the fuel flowing from an upstream side to the fuel nozzles, and a perforated plate located downstream of the fuel nozzles and having nozzle holes corresponding to the fuel nozzles. The fuel nozzle group includes outer circumferential fuel nozzles and inner circumferential fuel nozzles. Each outer diameter of at least a proximal end portion of the outer circumferential fuel nozzles is larger than each outer diameter of the inner circumferential fuel nozzles.

The gas turbine combustor according to the present invention includes a burner provided with a fuel nozzle group having a plurality of fuel nozzles for fuel supply, a fuel nozzle plate structurally supporting the fuel nozzles and serving to distribute the fuel flowing from an upstream side to the fuel nozzles, and a perforated plate located downstream of the fuel nozzles and having nozzle holes corresponding to the fuel nozzles. The fuel nozzle group comprises a center fuel nozzle group having the fuel nozzles each with the same outer diameter and a plurality of outer circumferential fuel nozzle groups. In the burner, the center fuel nozzle group is positioned at its center, and the plurality of outer circumferential fuel nozzle groups are arranged to surround the center fuel nozzle group when the fuel nozzle plate and the fuel nozzles are viewed from a downstream of the burner. Each of the outer circumferential fuel nozzle groups includes at least two kinds of fuel nozzles which are different in the outer diameter from each other, in which the fuel nozzles with a large outer diameter are arranged on an outer circumferential side which is a far side of the center fuel nozzle group, and the fuel nozzles with a small outer diameter are arranged on an inner circumferential side which is a near side of the center fuel nozzle group.

The gas turbine combustor according to the present invention includes a burner provided with a fuel nozzle group having a plurality of fuel nozzles for fuel supply, a fuel nozzle plate structurally supporting the fuel nozzles and serving to distribute the fuel flowing from an upstream side to the fuel nozzles, and a perforated plate located downstream of the fuel nozzles and having nozzle holes corresponding to the fuel nozzles. The fuel nozzle group comprises a center fuel nozzle group having the fuel nozzles each with the same outer diameter and a plurality of outer circumferential fuel nozzle groups. In the burner, the center fuel nozzle group is positioned at its center, and the plurality of outer circumferential fuel nozzle groups are arranged to surround the center fuel nozzle group when the fuel nozzle plate and the fuel nozzles are viewed from a downstream of the burner. Each of the outer circumferential fuel nozzle groups includes at least two kinds of fuel nozzles which are different in the outer diameter from each other. Based on a boundary defined by a radial distance from the center of the burner, in each of the outer circumferential fuel nozzle groups, the fuel nozzles with a large outer diameter are arranged in an outer circumferential range from the boundary on a far side of the center fuel nozzle group, and the fuel nozzles with a small outer diameter are arranged in an inner circumferential range from the boundary on a near side of the center fuel nozzle group.

The gas turbine combustor according to the present invention includes a burner provided with a fuel nozzle group having a plurality of fuel nozzles for fuel supply, a fuel nozzle plate structurally supporting the fuel nozzles and serving to distribute the fuel flowing from an upstream side to the fuel nozzles, and a perforated plate located downstream of the fuel nozzles and having nozzle holes corresponding to the fuel nozzles. The fuel nozzle group comprises a center fuel nozzle group having the fuel nozzles each with the same outer diameter and a plurality of outer circumferential fuel nozzle groups having the fuel nozzles each with the same outer diameter. In the burner, the center fuel nozzle group is positioned at its center, and the plurality of outer circumferential fuel nozzle groups are arranged to surround the center fuel nozzle group when the fuel nozzle plate and the fuel nozzles are viewed from a downstream of the burner. The outer diameter of the fuel nozzles of the center fuel nozzle group is smaller than the outer diameter of the fuel nozzles of the outer circumferential fuel nozzle groups.

The gas turbine combustor according to the present invention exhibits structural reliability to the vibration under the fluid force and high environmental performance owing to the uniform combustion, which are achieved by optimizing the outer diameter of the fuel nozzle under the fluid force which differs by the position of the fuel nozzle.

DETAILED DESCRIPTION OF THE PREFERRED EMBODIMENTS

Hereinafter, a gas turbine combustor according to the present invention will be described in reference to examples as shown in the drawings. The same components in the respective examples will be designated with the same reference signs.

First Embodiment

An example of components constituting a gas turbine plant 1 will be described referring to FIG. 1.

Figure 1:
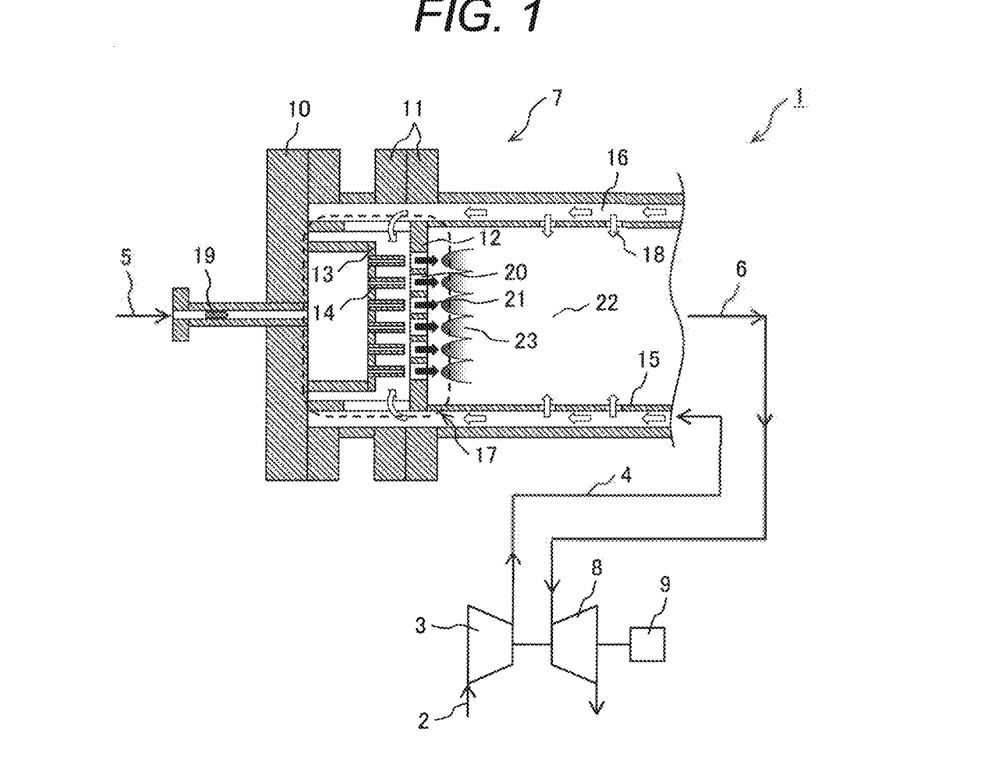
FIG. 1 is a sectional view of an exemplary gas turbine combustor according to the present invention, schematically illustrating flows of fuel and air, and a combustion process.

As FIG. 1 shows, the gas turbine plant 1 is mainly composed of a compressor 3 which compresses air 2 taken from the atmosphere, a combustor 7 which burns compressed air 4 compressed by the compressor 3 and fuel 5 for generating burnt gas 6 at high temperature and high pressure, a gas turbine 8 driven by the burnt gas 6 generated in the combustor 7 for extracting energy of the burnt gas 6 in the form of rotating power, and a generator 9 which generates power utilizing the rotating power extracted by the gas turbine 8.

The combustor 7 is composed of an end flange 10, an external cylinder 11, a perforated plate 12, a fuel nozzle plate 13, fuel nozzles 14, and a liner 15. The compressed air 4 compressed by the compressor 3 passes through a passage 16 defined by the external cylinder 11 and the liner 15, and flows into a burner 17. The compressed air 4 partially flows into the liner 15 as cooling air 18 so that the liner 15 is cooled.

The fuel 5 flows into the fuel nozzle plate 13 via a fuel feeding pipe 19 of the end flange 10, and passes through the respective fuel nozzles 14 for injection to the perforated plate 12. At an inlet of a nozzle hole 20 of the perforated plate 12 at a fuel nozzle side, the fuel 5 injected through the fuel nozzles 14 and the compressed air 4 are mixed. A mixture 21 of the fuel 5 and the compressed air 4 is injected toward a combustion chamber 22 to form a flame 23.

The combustor 7 of the example is configured to use such fuel as coke oven gases, refinery off-gases, and coal gasification gases in addition to natural gases.

Figure 2:
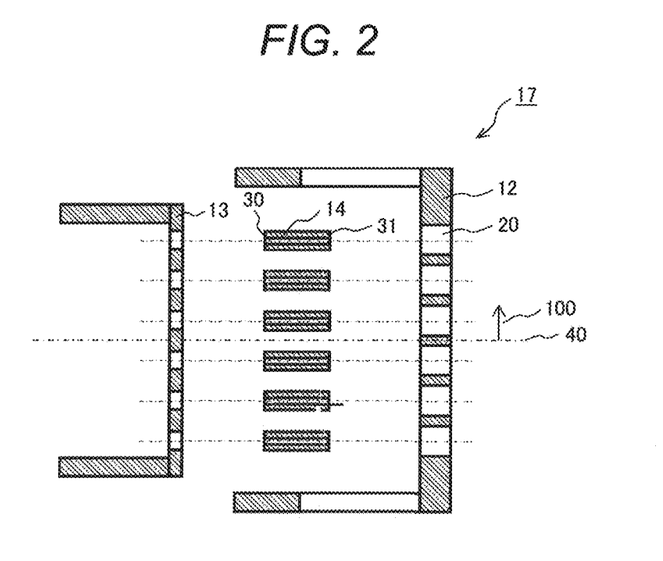
FIG. 2 is a sectional view of components constituting a burner of a gas turbine combustor as a first embodiment according to the present invention.

FIG. 2 illustrates components constituting the burner 17 of the gas turbine combustor as the first embodiment according to the present invention.

As FIG. 2 shows, the burner 17 is composed of the perforated plate 12, the fuel nozzle plate 13, and the fuel nozzles 14.

An upstream end 30 of the fuel nozzle 14 is metallurgically bonded to the fuel nozzle plate 13, and the bonded part is sealed to prevent leakage of the fuel 5. A downstream end 31 of the fuel nozzle 14 is not in contact with the nozzle hole 20 of the perforated plate 12 to allow free inflow of the compressed air 4 into the nozzle hole 20. Normally, the upstream end 30 of the fuel nozzle 14 and the fuel nozzle plate 13 are bonded by the welding process or the brazing process.

Figure 3:
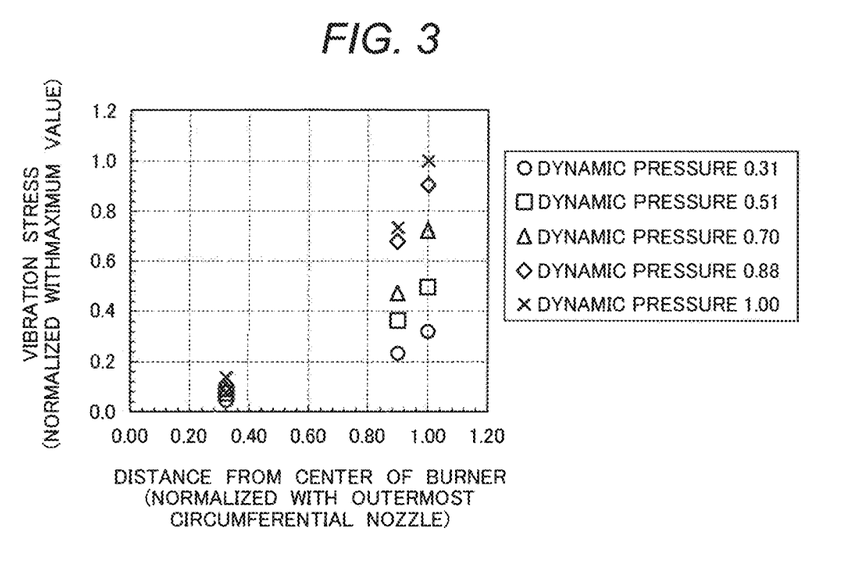
FIG. 3 represents a relation between the vibration stress which occurs in a fuel nozzle and the distance from the center of a burner in a generally employed structure.

FIG. 3 shows experimental data (relation between the vibration stress in the fuel nozzle and the distance from the center of the burner in the generally employed structure) as the basis of the present invention.

FIG. 3 represents the relation between the vibration stress that occurs in the fuel nozzle 14, which has been measured in an air flow testing for feeding the compressed air at normal temperature to the combustor with actual machine structure, and a distance 100 (see FIG. 2) between the fuel nozzle 14 and a center 40 of the burner.

FIG. 3 indicates that the vibration stress tends to be higher as the dynamic pressure at an inlet of the burner 17 becomes higher and as the fuel nozzle is located on the outer peripheral side away from the center 40 of the burner 17.

The testing results show that the fluid force acting on the outermost circumferential fuel nozzle 14 separating the farthest from the center 40 of the burner 17 becomes the highest, and the vibration stress in the outermost circumferential fuel nozzle 14 becomes the highest if each outer diameter of the fuel nozzles 14 is the same.

An explanation will be made as described below with respect to the mechanism in which the fluid force acting on the outermost circumferential fuel nozzle 14 is intensified.

The compressed air 4 flowing into the burner 17 as shown in FIG. 1 flows into the combustion chamber 22 via the perforated plate 12. Accordingly, as the compressed air 4 flows toward the center of the burner 17, the flow rate of the compressed air 4 flowing around the fuel nozzle 14 is reduced. In association with reduction in the flow rate, the flow velocity of the compressed air 4 flowing around the fuel nozzle 14 is decreased as well. Because of the positive correlation between the fluid force acting on the fuel nozzle 14 and the flow velocity of the compressed air, the fluid force acting on the outer circumferential fuel nozzle 14 is made higher than the fluid force acting on the inner circumferential fuel nozzle 14.

Figure 4:
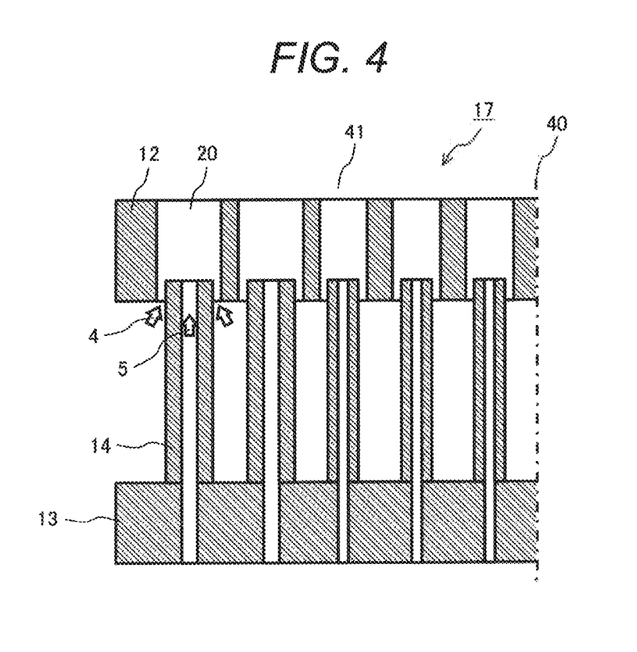
FIG. 4 is a sectional view of the fuel nozzles of the gas turbine combustor as the first embodiment according to the present invention, representing an outer diameter distribution of the fuel nozzles.

Referring to FIG. 4, an explanation will be made with respect to a structure of the burner 17 of the gas turbine combustor as an example according to the present invention.

As FIG. 4 shows, the burner 17 of the example is composed of a fuel nozzle group including the fuel nozzles (to be described later), the fuel nozzle plate 13 structurally supporting the fuel nozzles 14 and serving to distribute the fuel flowing from an upstream side to the fuel nozzles 14, and the perforated plate 12 for mixing the fuel 5 injected from the fuel nozzles 14 with the compressed air 4.

The generally employed burner has the fuel nozzles 14 each with the same outer diameter. As FIG. 4 indicates, in the burner 17 of the example according to the present invention, the outer diameter of the fuel nozzle 14 becomes smaller as it is arranged on the inner peripheral side closer to the center 40 of the burner 17, and the outer diameter of the fuel nozzle 14 becomes larger as it is arranged on the outer peripheral side (far side of the center 40 of the burner 17) farther from the center 40 of the burner 17. The outer circumferential fuel nozzles 14 with a large outer diameter are arranged at intervals smaller than those of the inner circumferential fuel nozzles 14 with a small diameter.

In the generally employed burner, the outer diameter of the fuel nozzle 14 is determined so that the vibration resistance is imparted to the outermost circumferential fuel nozzle 14 under the highest fluid force, and the inner circumferential fuel nozzle 14 closer to the center 40 of the burner 17 has the same outer diameter as that of the outer circumferential fuel nozzle 14.

In the burner 17 of the example according to the present invention, the outer diameter of the inner circumferential fuel nozzle 14 under the low fluid force is made smaller than that of the outer circumferential fuel nozzle 14. It is therefore possible to arrange the inner circumferential fuel nozzles 14 more densely than the outer circumferential fuel nozzles 14 to be arranged, resulting in improved fuel dispersiveness. Since the outer diameter of the inner circumferential fuel nozzle 14 is made smaller than that of the outer circumferential fuel nozzle 14, costs for manufacturing the fuel nozzles 14 may be reduced.

The outer circumferential fuel nozzles 14 may be shaped in different forms, that is, the fuel nozzles 14 having uniform outer diameters in the axial direction of the fuel nozzles 14, and having outer diameters variable along the axial direction of the fuel nozzles 14.

Referring to FIG. 4, if the outer diameters of the fuel nozzles 14 are made uniform in the axial direction, an inner diameter of the nozzle hole 20 of the perforated plate 12 becomes different between the inner and the outer circumferential sides. Therefore, designing has to be performed in consideration of the difference in the inner diameter of the nozzle hole 20 between the inner and the outer circumferential sides.

If the outer diameter only of a proximal end of the outer circumferential fuel nozzle 14 is made larger as described later in a fifth embodiment, outer diameters of tip ends of both the outer and the inner circumferential fuel nozzles 14 may be made uniform.

In the above-described structure of the example, the large-outer-diameter fuel nozzles 14 are disposed at the outer circumferential side of the burner 17 under the higher active fluid force, and the small-outer-diameter fuel nozzles 14 are disposed at the inner circumferential side under the lower active fluid force. This makes it possible to optimize the outer diameter of the fuel nozzle 14 in conformity with the fluid force that differs by the position of the fuel nozzle 14, resulting in the structural reliability to the vibration under the fluid force, and high environmental performance owing to the uniform combustion.

Second Embodiment

Figure 5:
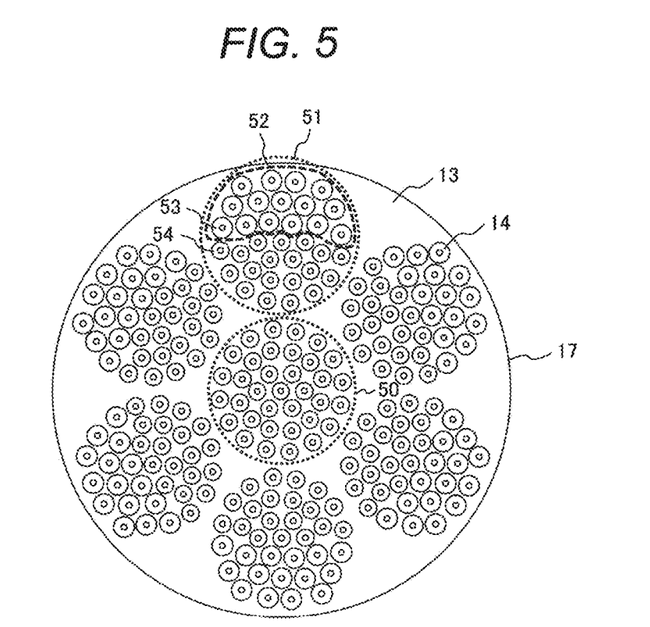
FIG. 5 illustrates the outer diameter distribution of the fuel nozzles of the gas turbine combustor as a second embodiment according to the present invention when a fuel nozzle plate and the fuel nozzles are viewed from a downstream side of the burner in the absence of a perforated plate.

FIG. 5 illustrates the structure of the burner 17 of the gas turbine combustor as a second embodiment according to the present invention in detail. FIG. 5 shows the fuel nozzle plate 13 and the fuel nozzles 14 viewed from a downstream 41 of the burner (see FIG. 4) in the absence of the perforated plate 12 as shown in FIG. 4.

Normally, the burner 17 of the combustor 7 in the example according to the present invention as shown in FIG. 5 includes a plurality of fuel supply systems. Referring to FIG. 5, a center fuel nozzle group 50 including the fuel nozzles 14 each with the same outer diameter is positioned at the center of the burner 17. A plurality of outer circumferential fuel nozzle groups 51 are arranged to surround the center fuel nozzle group 50. One of the outer circumferential fuel nozzle groups 51 includes at least two kinds of fuel nozzles 53, 54 which have outer diameters different from each other. The large-outer-diameter fuel nozzles 53 of the outer circumferential fuel nozzle group 51 are arranged at the outer circumferential side (outer radial side of the burner 17) on a far side of the center fuel nozzle group 50. The small-outer-diameter fuel nozzles 54 of the outer circumferential fuel nozzle group 51 are arranged at the inner circumferential section on a near side of the center fuel nozzle group 50.

A boundary is defined by an arbitrary radial distance from the center of the outer circumferential fuel nozzle group 51. The large-outer-diameter fuel nozzles 53 of the outer circumferential nozzle group 51 are arranged in an outer circumferential range from the boundary on the far side (outer radial side of the burner 17) of the center fuel nozzle group 50. The small-outer diameter fuel nozzles 54 of the outer circumferential fuel nozzle group 51 are arranged in an inner circumferential range from the boundary on the near side of the center fuel nozzle group 50.

In the burner 17, the fuel supply system differs by the center fuel nozzle group 50 and the outer circumferential fuel nozzle groups 51 at the outer circumferential side. The fluid force acting on the fuel nozzle 14 becomes high as the fuel nozzle is positioned toward the outer circumferential side of the burner 17. Therefore, the fluid force acting on the outer circumferential fuel nozzle group 51 becomes higher than the fluid force acting on the center fuel nozzle group 50. Especially, the fluid force acting on a fuel nozzle group 52 composed of the large-outer-diameter fuel nozzles 53 of the outer circumferential fuel nozzle group 51 becomes higher.

Figure 6:
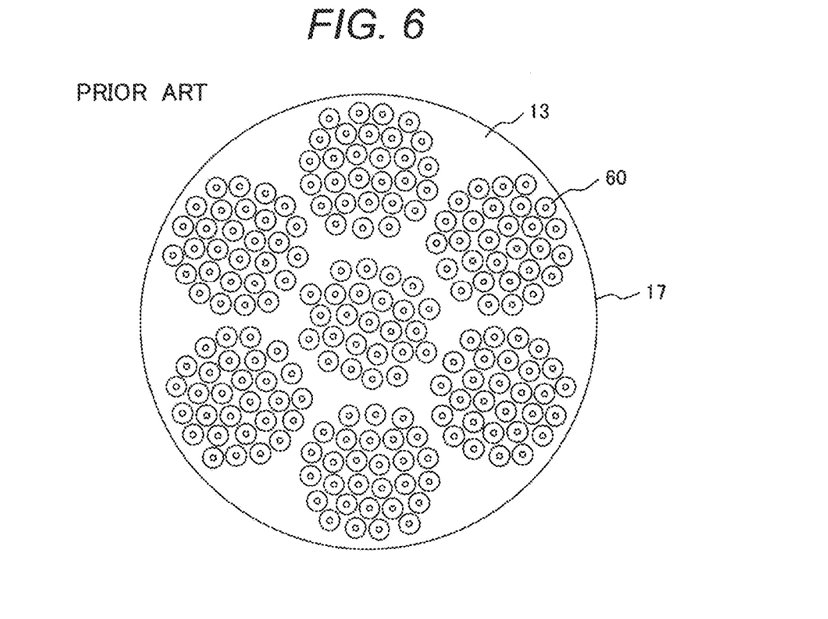
FIG. 6 illustrates the outer diameter distribution of the fuel nozzles in the generally employed structure, which corresponds to FIG. 5.

In the generally employed designing approach as shown in FIG. 6, the outer diameter of the fuel nozzle 14 is determined so that the strength is imparted to an outermost circumferential fuel nozzle 60 to resist the highest fluid force. The determined outer diameter is set for all the fuel nozzles 14.

Meanwhile, in the second embodiment according to the present invention as shown in FIG. 5, the fuel nozzle group 52 includes the large-outer-diameter fuel nozzles 53 under the high fluid force, each having the same outer diameter as the one as shown in FIG. 6. Otherwise, the small-outer-diameter fuel nozzles 54 are used at the inner circumferential side. The outer diameter of each of the fuel nozzles of the center fuel nozzle group 50 is set to be the same as that of each of the fuel nozzles 54 of the outer circumferential fuel nozzle group 51 on the near side of the center fuel nozzle group 50. This makes it possible to arrange the fuel nozzles highly densely, and reduce the manufacturing costs.

The structure of the above-described example according to the present invention provides similar effects to those derived from the first embodiment, and ensures to arrange the fuel nozzles highly densely and reduce the manufacturing costs.

Third Embodiment

Figure 7:
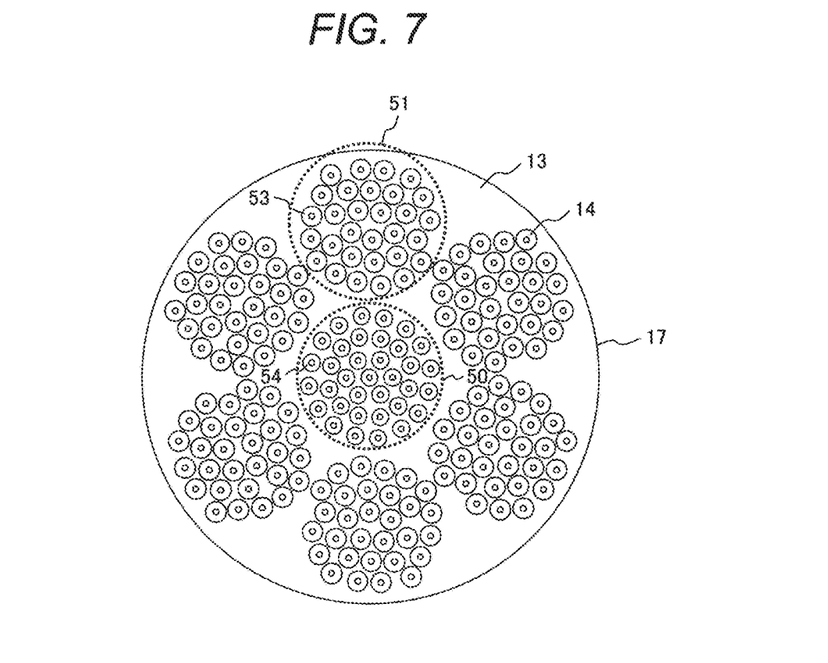
FIG. 7 illustrates the outer diameter distribution of the fuel nozzles of the gas turbine combustor as a third embodiment according to the present invention, which corresponds to FIG. 5.

FIG. 7 illustrates a structure of the burner 17 of the gas turbine combustor as a third embodiment according to the present invention in detail.

Similarly to FIG. 5, FIG. 7 illustrates the fuel nozzle plate 13 and the fuel nozzles 14 viewed from the downstream 41 of the burner in the absence of the perforated plate 12 as shown in FIG. 4.

In the structure as shown in FIG. 7, the fuel supply system differs by the center fuel nozzle group 50 positioned at the center of the burner 17, and the outer circumferential fuel nozzle groups 51 disposed at the outer circumference of the burner 17. The fluid force acting on the fuel nozzle 14 becomes higher as it is positioned toward the outer circumferential side of the burner 17. Accordingly, the fluid force acting on the outer circumferential fuel nozzle group 51 is higher than the fluid force acting on the center fuel nozzle group 50.

In the example according to the present invention, the outer circumferential fuel nozzle groups 51 surrounding the center fuel nozzle group 50 under the higher fluid force use the large-outer-diameter fuel nozzles 53 each having the same outer diameter as the one as shown in FIG. 5. Meanwhile, the center fuel nozzle group 50 positioned at the center uses the small-outer-diameter fuel nozzles 54. This ensures to arrange the fuel nozzles highly densely and reduce the manufacturing costs.

In the second embodiment according to the present invention as shown in FIG. 5, only each outer diameter of the fuel nozzles 53 constituting the fuel nozzle group 52 of the outer circumferential fuel nozzle group 51 under especially high fluid force is made larger. In this example according to the present invention, each outer diameter of the fuel nozzles 53 is made uniform for the respective fuel supply systems so that the manufacturing cost reduction is expected.

The above-described example provides the similar effects to those derived from the second embodiment.

Fourth Embodiment

Figure 8:
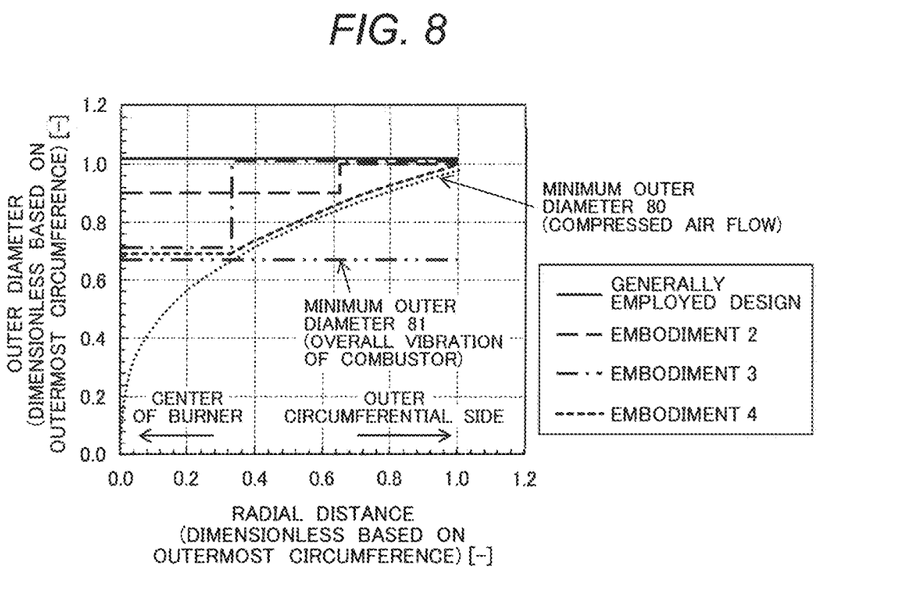
FIG. 8 represents the outer diameter distribution of the fuel nozzles of the gas turbine combustor as a fourth embodiment according to the present invention.

FIG. 8 represents the distribution of the outer diameter of the fuel nozzle of the gas turbine combustor as a fourth embodiment according to the present invention.

Referring to FIG. 8, testing data as shown in FIG. 3 indicates that the fluid force acting on the fuel nozzle 14 is proportional to the radial distance of the fuel nozzle 14 from the center of the burner.

Assuming that the fluid force is defined as the uniform distribution load, and the fuel nozzle 14 is cantilevered, the stress is inversely proportional to the cube of the outer diameter of the fuel nozzle 14. If the vibration stress which occurs in the fuel nozzles 14 is made uniform irrespective of the radial distance, the outer diameter of the fuel nozzle 14 is proportional to ⅓ power of the radial distance as indicated by a minimum outer diameter 80 as shown in FIG. 8.

The overall vibration of the combustor has to be considered besides the fluid force associated with the compressed air flow. Therefore, the outer diameter of the fuel nozzle 14 has the lower limit value such as a minimum outer diameter 81 as shown in FIG. 8.

Generally, the outer diameter of the fuel nozzle 14 is determined by designing the strength to be imparted to the fuel nozzle at the outermost circumference, and the same outer diameter is set for all the fuel nozzles irrespective of the radial distance from the center of the burner.

Meanwhile, in the second embodiment as shown in FIG. 5, the single fuel nozzle group includes two kinds of fuel nozzles having outer diameters different from each other. In the third embodiment as shown in FIG. 7, two kinds of fuel nozzles having different outer diameters are used for the center fuel nozzle group, and the outer circumferential fuel nozzle groups, respectively. The outer diameter of the fuel nozzle is set to be equal to or larger than the minimum outer diameter as shown in FIG. 8.

In the example according to the present invention, the outer diameter of the fuel nozzle may be defined along the distribution of the minimum outer diameter. As the outer diameters of the fuel nozzles differ by the radial distance from the center of the burner, the example is implemented on the assumption that the burner 17 is manufactured by such process as three-dimensional lamination shaping.

In the structure of the example according to the present invention, the outer diameters of all the fuel nozzles become the minimum outer diameter required for securing the strength. The example provides the similar effects to those derived from the first embodiment, and allows the fuel nozzles to be arranged with the highest density.

Fifth Embodiment

Figure 9:
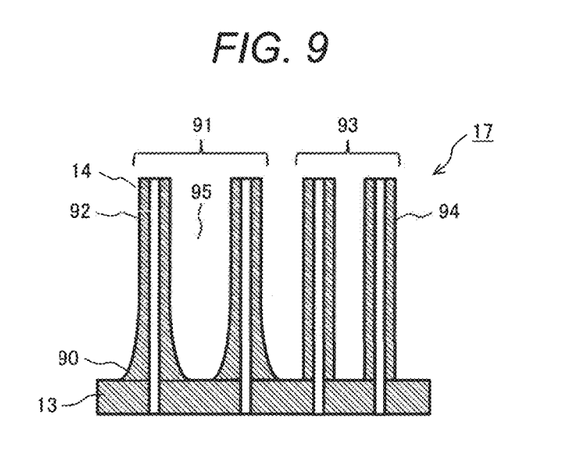
FIG. 9 is a sectional view of each shape of the fuel nozzles of the gas turbine combustor as a fifth embodiment according to the present invention.

FIG. 9 illustrates a structure of the burner 17 of the gas turbine combustor as a fifth embodiment according to the present invention in detail. FIG. 9 is a sectional view of the burner 17 composed of the fuel nozzle plate 13 and the fuel nozzles 14.

A proximal end 90 of the fuel nozzle 14 is a portion where the highest vibration stress occurs. In the example according to the present invention, the outer diameter of the proximal end 90 of the fuel nozzle 14 at an outer circumferential side 91 is made large to reduce the vibration stress. An outer diameter 92 of a tip end of the fuel nozzle 14 is made the same as an outer diameter 94 of the fuel nozzle 14 at an inner circumferential side 93 for reducing the pressure loss which occurs when the compressed air 4 passes through a region 95 between the fuel nozzles.

Since the fluid force acting on the fuel nozzles 14 at the inner circumferential side 93 is low, the outer diameter 94 is made uniform in the axial direction of the fuel nozzle. As the small-outer-diameter fuel nozzles 14 are arranged highly densely, the fuel dispersiveness may be improved.

The above-described example provides the similar effects to those derived from the first embodiment, and reduces the pressure loss which occurs when the compressed air 4 passes through the region 95 between the fuel nozzles.

The examples have been described in detail for readily understanding of the present invention. The present invention is not necessarily limited to the one provided with all structures as described above. It is possible to partially replace a structure of one of the examples with a structure of another example, or partially add the structure of one of the examples to the structure of another example. It is also possible to add, eliminate, and replace a part of the structure of one of the examples to, from, and with a part of the structure of another example.

REFERENCE SIGNS LIST

1: gas turbine plant, 2: air, 3: compressor, 4: compressed air, 5: fuel, 6: burnt gas, 7: combustor, 8: gas turbine, 9: generator, 10: end flange, 11: external cylinder, 12: perforated plate, 13: fuel nozzle plate, 14: fuel nozzle, 15: liner, 16: passage between external cylinder and liner, 17: burner, 18: cooling air, 19: fuel feeding pipe, 20: nozzle hole of perforated plate, 21: mixture of fuel and compressed air, 22: combustion chamber, 23: flame, 30: upstream end of fuel nozzle, 31: downstream end of fuel nozzle, 40: center of burner, 41: downstream of burner, 50: center fuel nozzle group at center of burner, 51: fuel nozzle group on outer radial side of burner, 52: outermost circumferential fuel nozzle group of burner, 53: large-outer-diameter fuel nozzle, 54: small-outer-diameter fuel nozzle, 60: outermost circumferential fuel nozzle, 90: proximal end of fuel nozzle, 91: outer circumferential side, 92: outer diameter of tip end of outer circumferential fuel nozzle, 93: inner circumferential side, 94: outer diameter of tip end of inner circumferential fuel nozzle, 95: region between fuel nozzles, and 100: distance from center of burner

What is claimed is:

1. A gas turbine combustor provided with a burner, the burner comprising:
   a fuel nozzle group having fuel nozzles for fuel supply;
   a fuel nozzle plate which structurally supports the fuel nozzles and serves to distribute a fuel flowing from an upstream side to the fuel nozzles; and
   a perforated plate located downstream of the fuel nozzles and having nozzle holes corresponding to the fuel nozzles, wherein
      compressed air flows into the burner from an outer circumference of the fuel nozzle plate, the fuel nozzle group including outer circumferential fuel nozzles and inner circumferential fuel nozzles, each of the outer circumferential fuel nozzles having a first outer diameter of at least a proximal end portion of the respective outer circumferential fuel nozzle being larger than a second outer diameter of each of the inner circumferential fuel nozzles,
   the inner circumferential fuel nozzles are more densely arranged than the outer circumferential fuel nozzles, and
   the fuel nozzle group including a center nozzle group and outer nozzle groups, the center nozzle group having a center that is a center axis of the burner and a radial direction with respect to the center axis, the center nozzle group having inner circumferential fuel nozzles arranged within a circular area and the center nozzle group is circumferentially surrounded by the outer nozzle groups, the outer nozzle groups each having both inner circumferential fuel nozzles and outer circumferential fuel nozzles arranged within a respective similar circular area of each outer nozzle group, all of the inner circumferential fuel nozzles of the center nozzle group and of the outer nozzle groups being located within a radial distance from the center axis, and all of the outer circumferential fuel nozzles being located radially outward of the radial distance.

2. The gas turbine combustor according to claim 1, wherein in the fuel nozzle group, the outer circumferential fuel nozzles are arranged at an interval smaller than an interval of the inner circumferential fuel nozzles.

3. The gas turbine combustor according to claim 1, wherein only the respective proximal end portion of each of the outer circumferential fuel nozzles has the first outer diameter being larger than the second outer diameter, and each respective tip end portion of each of all of the fuel nozzles has a same outer diameter.

4. The gas turbine combustor according to claim 1, wherein an outer diameter of the fuel nozzles of the center nozzle group is the same as an outer diameter of the fuel nozzles of the outer nozzle groups which are near the center nozzle group.

5. The gas turbine combustor according to claim 1, wherein sectional shapes of all the fuel nozzles are made uniform in an axial direction of the fuel nozzles.

* * * * *